(12) United States Patent
Serrano et al.

(10) Patent No.: US 6,594,106 B1
(45) Date of Patent: Jul. 15, 2003

(54) ADAPTIVE SERVO ESTIMATOR AND COMPENSATOR FOR COIL AND CARRIAGE DEFORMATION IN VOICE COIL MOTOR DRIVEN HARD DISK DRIVE

(75) Inventors: Louis Joseph Serrano, San Jose, CA (US); Mantle Man-Hon Yu, San Jose, CA (US); Kirk Barrows Price, San Jose, CA (US); Lei Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,865

(22) Filed: Oct. 29, 1999

(51) Int. Cl.$^7$ .............................................. G11B 5/596
(52) U.S. Cl. ................................. 360/78.09; 360/77.04
(58) Field of Search ........................... 360/78.09, 73.03, 360/78.04, 77.02; 369/32, 43, 44.27; 318/560–562

(56) References Cited

U.S. PATENT DOCUMENTS

| | | | | |
|---|---|---|---|---|
| 4,149,201 A | * | 4/1979 | Card ............................. | 360/77 |
| 4,914,644 A | | 4/1990 | Chen et al. ..................... | 369/43 |
| 5,128,813 A | * | 7/1992 | Lee ............................ | 360/78.07 |
| 5,182,684 A | | 1/1993 | Thomas et al. ........... | 360/78.09 |
| 5,268,804 A | * | 12/1993 | Wallis ...................... | 360/78.04 |
| 5,369,345 A | * | 11/1994 | Phan et al. .................. | 318/561 |
| 5,381,282 A | * | 1/1995 | Arai et al. ............... | 360/78.09 |
| 5,402,400 A | | 3/1995 | Hamada et al. ............... | 369/32 |
| 5,465,183 A | | 11/1995 | Hattori ...................... | 360/78.9 |
| 5,469,414 A | * | 11/1995 | Okamura ...................... | 369/32 |
| 5,510,939 A | | 4/1996 | Lewis ........................ | 360/78.9 |
| 5,566,378 A | | 10/1996 | Nagasawa et al. ........ | 360/77.16 |
| 5,594,603 A | * | 1/1997 | Mori et al. .............. | 360/78.04 |
| 5,684,650 A | | 11/1997 | Kadlec et al. ........... | 360/77.06 |
| 5,886,846 A | | 3/1999 | Pham et al. ............. | 360/78.04 |
| 6,064,540 A | * | 5/2000 | Huang et al. ................. | 360/75 |
| 6,392,833 B1 | * | 5/2002 | Wood et al. ............. | 360/73.03 |

\* cited by examiner

*Primary Examiner*—David Hudspeth
*Assistant Examiner*—K. Wong
(74) *Attorney, Agent, or Firm*—Randall J. Bluestone; Bracewell & Patterson, L.L.P.

(57) ABSTRACT

A system and method for adaptively compensating for real-time variations in mechanical dynamics of a head-positioning assembly during track follow and seek operations. The head-positioning assembly includes a voice coil actuator that positions a read/write head utilizing a coil and carriage in conformity with an actuator control signal. Variations in resonant mode characteristics are anticipated in real-time in accordance with measured temperature variations. These parametric variations are translated in real-time by a state space model to determine a secondary velocity and displacement of the read/write head during track follow and seek operations. In response to this secondary velocity and displacement determination, the actuator control signal is dynamically adjusted to compensate for the determined secondary head velocity and displacement, thereby improving head positioning accuracy and increasing servo bandwidth.

48 Claims, 5 Drawing Sheets

ADAPTIVE SERVO ESTIMATOR AND COMPENSATOR FOR COIL AND CARRIAGE DEFORMATION IN VOICE COIL MOTOR DRIVEN HARD DISK DRIVE

CROSS-REFERENCE TO RELATED APPLICATIONS

The U.S. patent application Ser. No. 09/429,864 entitled "Servo System Responsive to Temperature Changes", Ser. No. 09/303,919, filed May 3, 1999, and the U.S. patent application entitled "Vibration Model Compensation For Disk Drive", filed concurrently herewith, are incorporated herein by reference.

BACKGROUND OF THE INVENTION

1. Field of the Invention

The present invention relates in general to an improved digital storage system and in particular to a method and system for improving the bandwidth of a voice coil actuator (VCA) within a hard disk drive (HDD). More particularly, the present invention relates to an improved method and system for compensating for second-order resonant frequency effects within a VCA coil and carriage assembly. Still more particularly, the present invention relates to detecting and tracking butterfly modal parameters within a VCA, such that butterfly mode frequency and amplitude may be anticipated, and undertaking remedial compensation measures in response thereto, such that the contribution of mechanical deformation interference with VCA head positioning is minimized.

2. Description of the Related Art

Generally, a digital data storage system consists of one or more storage devices that store data on storage media such as magnetic or optical data storage disks. In magnetic disk storage systems, a storage device is called a hard disk drive (HDD), and includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at speeds often exceeding ten thousand revolutions per minute (rpm).

The only other moving part within a typical HDD is the head assembly. Within most drives, one read/write head is associated with each side of each platter and flies just above or below the platter's surface. Each read/write head is connected to a flexible arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a VCA driven by a servo voice coil motor (VCM). The stator of a VCM is mounted to a base plate or casting on which is mounted a spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

Modern HDD throughput and storage capacity have been substantially enhanced by improvement in actuator design which has resulted in increased precision and speed in head placement. The more precisely the actuator can place the read/write head, the greater the amount of data that can be packed onto a given area of disk surface (often referred to as areal density). The term "servo bandwidth" will be utilized hereinafter to denote the cross-over frequency of an open loop transfer function (See Appendix A) applied to a head positioning system. The demand for increased speed and storage capacity has resulted in ever faster and more compact hard disk drive (HDD) assemblies. As the track densities of HDDs increase, a high servo bandwidth is required to improve the Track Misregistration (TMR) performance. Mechanical resonance of the coil and carriage is one of the dominant factors that limit the servo bandwidth of a voice coil driven HDD. As the track density of HDDs increases, a high servo bandwidth is required to improve the efficiency of read/write operations as measured by TMR as well as other performance indicators.

It would therefore be desirable to provide an improved method and system for minimizing the contribution of dynamic mechanical deformation of a HDD suspension and head apparatus to the off-track position error of read/write heads in a digital recording system. If implemented, such a system would serve to increase the servo bandwidth and thus the effective track density of a HDD assembly.

SUMMARY OF THE INVENTION

It is therefore an object of the invention to provide a method and system for improving the bandwidth of a voice coil actuator (VCA) within a hard disk drive (HDD).

It is another object of the invention to provide an improved method and system for adaptively compensating for resonant frequency effects within a VCA coil and carriage assembly.

It is still another object of the invention to provide an improved method and system for anticipating real-time resonant vibration characteristics and undertaking remedial compensation measures in response thereto, such that the contribution of mechanical deformation to interference with VCA head positioning is minimized.

The above and other objects are achieved as is now described. A system and method for adaptively compensating for real-time variations in mechanical dynamics of a head-positioning assembly during track follow and seek operations are disclosed. The head-positioning assembly includes a voice coil actuator that positions a read/write head utilizing a coil and carriage in conformity with an actuator control signal. Predetermined temperature dependent calibration measurements are utilized to predict resonant mode characteristics, such as amplitude and frequency of butterfly mode resonance, at different coil temperatures. Variations in these butterfly mode resonance characteristics are then anticipated in real-time in accordance with measured temperature variations. These parametric variations are translated in real-time utilizing a state space model to model deformation of the coil and carriage resulting from flexibility within the coil and carriage. A secondary displacement of the read/write head is thereby adaptively estimated in accordance with variations in physical plant parameters such as temperature utilizing the state space model. In response to the displacement estimation, the actuator control signal is dynamically adjusted to compensate for the computed secondary head velocity and displacement, thereby improving head positioning accuracy and increasing servo bandwidth.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

As the track density of servo-drive hard disk drives increases, a high servo bandwidth is required to improve drive performance as measured by Track Misregistration (TMR), Position Error Signal (PES), etc. Mechanical resonance experienced by the head-positioning assembly, and in particular the resonance experienced by the voice coil actuator (VCA) within the assembly, is one of the dominant factors that limit the servo bandwidth of a voice coil motor driven hard disk drive. The dominant resonance experienced by disk drives is widely known in the art as "butterfly mode" (BFM). The method and system of the present invention propose a servo-compensation technique for minimizing the contribution of dynamic mechanical deformation within a head positioning assembly to the off-track position error of recording heads in a digital recording system. Such a method and system utilize a servo estimator to anticipate the BFM-induced dynamics of the VCA, thereby increasing VCA bandwidth and effective track density. This servo estimator functions as a virtual sensor which first anticipates BFM frequency and/or amplitude, and computes resulting secondary head positioning parameters, such as secondary head displacement and velocity (plant parameters), which can then be utilized as real-time servo positioning feedback for the servo controller.

The servo controller responds to such predicted fluctuations in BFM-induced plant parameters by adjusting the servo control signal to compensate for and minimize unintended secondary read/write head displacement caused by BFM resonance within the VCA. In this manner, the servo controller may adapt and compensate for modal changes (i.e., changes in BFM frequency or amplitude) caused by temporally varying factors such as drive temperature. These adaptive techniques improve the robustness of the servo system by identifying and tracking anticipated variations in the mechanical dynamics of a coil and carriage comprising the VCA with changes of such physical parameters as dimensions, material properties, and operation temperature which are known to alter the frequency and/or amplitude of BFM resonance.

Figure 1:
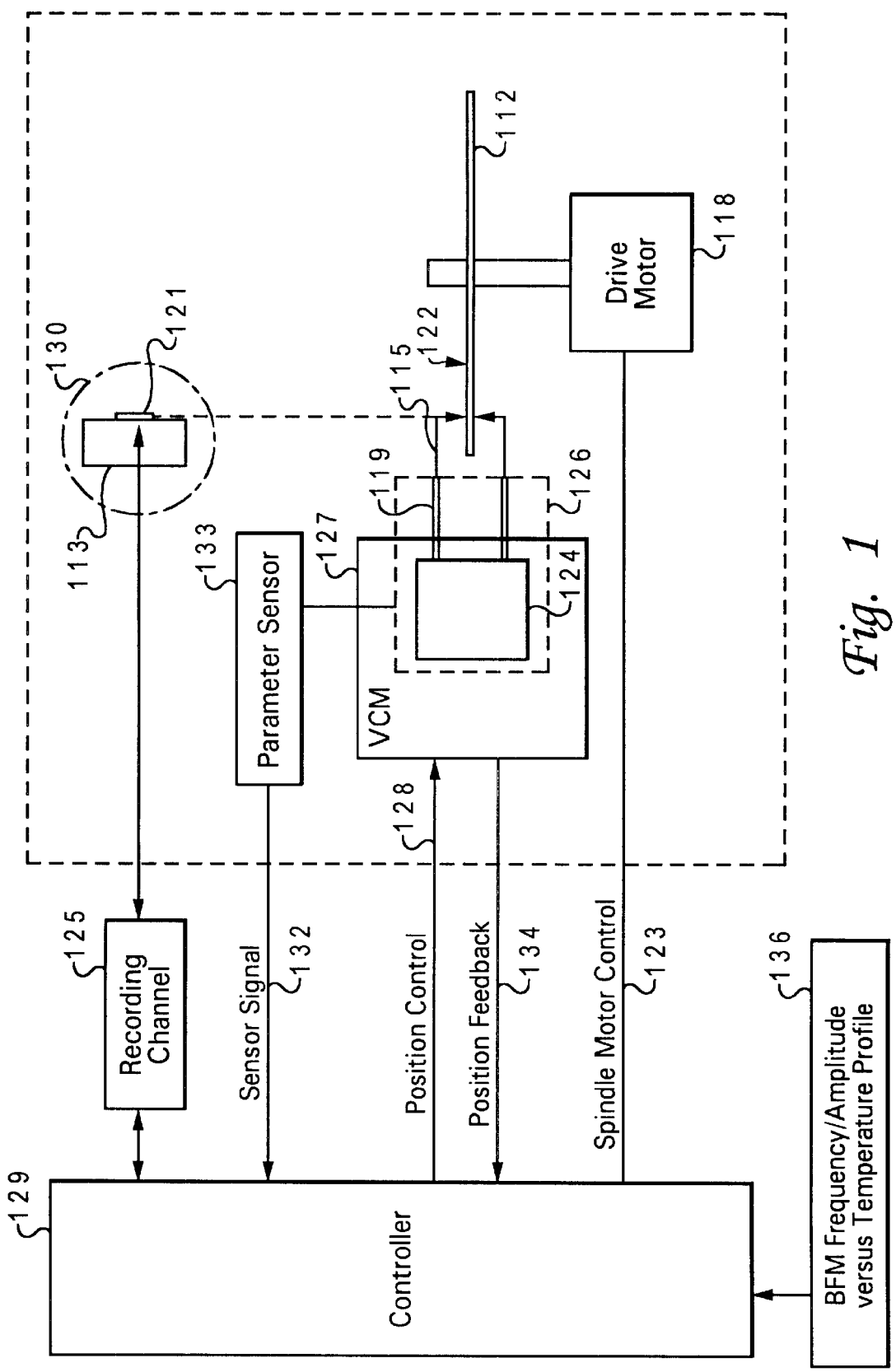
FIG. 1 illustrates a block diagram of a hard disk drive system suitable for implementing servo estimation and compensation in accordance with the teachings of the present invention.

Turning now to the figures, and in particular with reference to FIG. 1 is a high level block diagram illustrating a HDD system 100 suitable for utilizing servo estimation and compensation in accordance with the teachings of the present invention. The invention described hereinbelow is useful with all electromechanical configurations of data storage disk drives or direct access storage devices (DASD). Included within such configurations in which the present invention may be practiced are multiple drive arrays such as a Redundant Array of Independent Disks (RAID) system. Also, it will be appreciated that the invention is also applicable to, and may be utilized by, other information storage systems, such as an optical data storage system.

HDD system 100 is comprised of a HDD 102 that is electromechanically connected to a disk controller 129 via a recording channel 125, a head position control line 128, and a motor control line 123. At least one rotatable magnetic disk 112 is mounted on a spindle/hub 114 that is supported by a bearing within a disk drive motor 118 by which disk 112 is rotated. The magnetic recording media on each disk is generally in the form of an annular pattern of concentric data tracks (not shown) on disk 112. At least one head assembly 130 is positioned on the rotating disk 112 during normal read and write operations. Each head assembly 130 is comprised of a slider 113 that supports one or more magnetic read/write heads 121. As disk 112 rotates, head assembly 130 is moved radially in and out so that the heads 121 may access different portions of the disk surface 122 containing the data. Each head assembly 130 is attached to an actuator arm 119 by means of a suspension and head assembly 115. The suspension and head assembly 115 provides a slight spring force which biases the slider 113 against the rotating disk surface 122. While HDD 102 is at rest, the slider 113 may either be parked on the stationary disk surface 122 or it may be parked on a cantilevered ramp off of disk surface 122 or it may be removed from disk surface 122 by a suitable cam mechanism.

Each actuator arm 119 is attached to a coil 124 which serves as an actuating means within voice coil motor (VCM) 127. Together, actuator arm 119 and coil 124 comprise a servo-voice coil actuator 126. VCM 127 is a closed-loop device which utilizes servo-voice coil actuator 126 to track and re-position read/write heads 121 in accordance with real time feedback from head 130. It should be apparent that HDD 102 may contain a large number of disks and actuators, and each actuator may support a number of sliders.

The various components of HDD 102 include logic control circuits, storage means and a microprocessor. These components are controlled in operation by signals generated by disk controller (read/write electronics) 129, such as access control signals and internal clock signals. Disk controller 129 generates control signals to control various system operations such as motor control signals on line 123 and head position control signals on line 128. The control signals on line 128 provide the desired current profiles to optimally move and position a selected slider 113 to the desired data track on the associated disk 112. Read and write signals are communicated to and from read/write heads 121 by means of recording channel 125, which includes conductor lines running along suspension and head assembly 115 and actuator arm 119. In this manner, disk controller 129 controls physical and logical access to HDD 102.

Controller 129 receives positional information from actuator 126 through a position readback signal 134. HDD 102 also includes a parameter sensor 133 for sensing at least one operational parameter such as the operating temperature of coil 124. Parameter sensor 133 may comprise a number of parameter detection devices including a thermocouple, a sensor for measuring the resistance of coil 124, and other instruments capable of measuring pertinent operating parameters in real time. In a preferred embodiment of the present invention, the temperature of coil 124 is utilized as the BFM parameter tracked by sensor 133. In this case, coil resistance of coil 124 is measured by applying a known current or voltage across coil 124 and measuring the corresponding voltage or current utilizing a suitable analog-to-digital (A/D) converter. The BFM parameter information thus obtained is delivered in real time from sensor 133 to controller 129 via a sensor signal 132.

The frequency and amplitude of BFM vibration resonance vary as a function of both physical characteristics of each head positioning assembly, and also operational parameters such as voice coil temperature. Parameter sensor 133 and sensor signal 132, together with pre-determined BFM frequency versus temperature input 136, therefore comprise an embedded real-time butterfly mode identification system for providing a real-time estimate of at least one BFM response characteristic, such as the frequency or amplitude of the vibration induced by the resonant condition. This system facilitates identification of real-time BFM frequency and amplitude by utilizing knowledge of the relationship between BFM resonance and the real-time temperature of coil 124 which may be estimated by measuring the electrical resistance of coil 124, thus utilizing coil 124 as a proxy for sensor 133. The coil resistance can be measured by applying a known current or voltage and measuring the corresponding voltage or current across the coil through an A/D converter, which is available for Load/Unload (L/UL) drives.

The dependence of the BFM frequency on the operating temperature of coil 124 above room temperature can be determined and accounted for in a customized manufacturing process. In this manner the frequency dependence of BFM on temperature can be identified and recorded on a file-by-file basis. In one embodiment of the present invention, a limited band transfer function calibration method is applied against a given coil resistance, which can be measured at different temperatures as described above. It can be empirically demonstrated that below room temperature, the rate at which BFM frequency decreases as coil temperature increases does not vary appreciably among individual drives sharing the same physical parameters. Therefore, if HDD 102 is to be operated below room temperature, the drive-by-drive manufacturing customization process may not be required.

In an alternate embodiment of the present invention, a calibration system can be utilized to provide dynamic adjustments of the BFM frequency characteristic input 136 in response to a particular triggering event. Such a calibration system would include a limited band error rejection transfer function calibration of BFM frequency with resistance of the coil or other physical parameters, and a trigger mechanism, such as a threshold of detected TMR or Non-Repeatable Runout (NRRO), for controller 129 to execute a BFM calibration while HDD 102 is idle. This approach replaces the manufacturing customization process at the cost of processing time required to do the on-line calibration, and may compensate the shift of frequency vs. temperature profile due to aging of the coil and other parameters of the physical system not included in the model.

Consistent with the spirit and scope of the present invention, the embedded real-time BFM identification methods described above may also include a real-time BFM frequency identification utilizing operating parameters other than coil temperature. For example, the relationship between BFM frequency and power consumption of the coil could be utilized and BFM frequency could be estimated with a running average power consumption.

As explained in further detail in the following figures, HDD system 100 also includes an embedded real-time BFM compensation system. This compensation system may be located within controller 129 and includes an algorithm that translates BFM frequency and amplitude into the mechanical dynamics model parameters of the coil and carriage, and an adaptive algorithm that determines the compensation gains accordingly. These two algorithms are utilized to update the model parameters in conformity with real time changes within actuator 126. In one embodiment of the present invention, one of the algorithms is a Taylor series expansion and the other is a polynomial interpolation of the model parameters in terms of BFM frequency.

Figure 2:
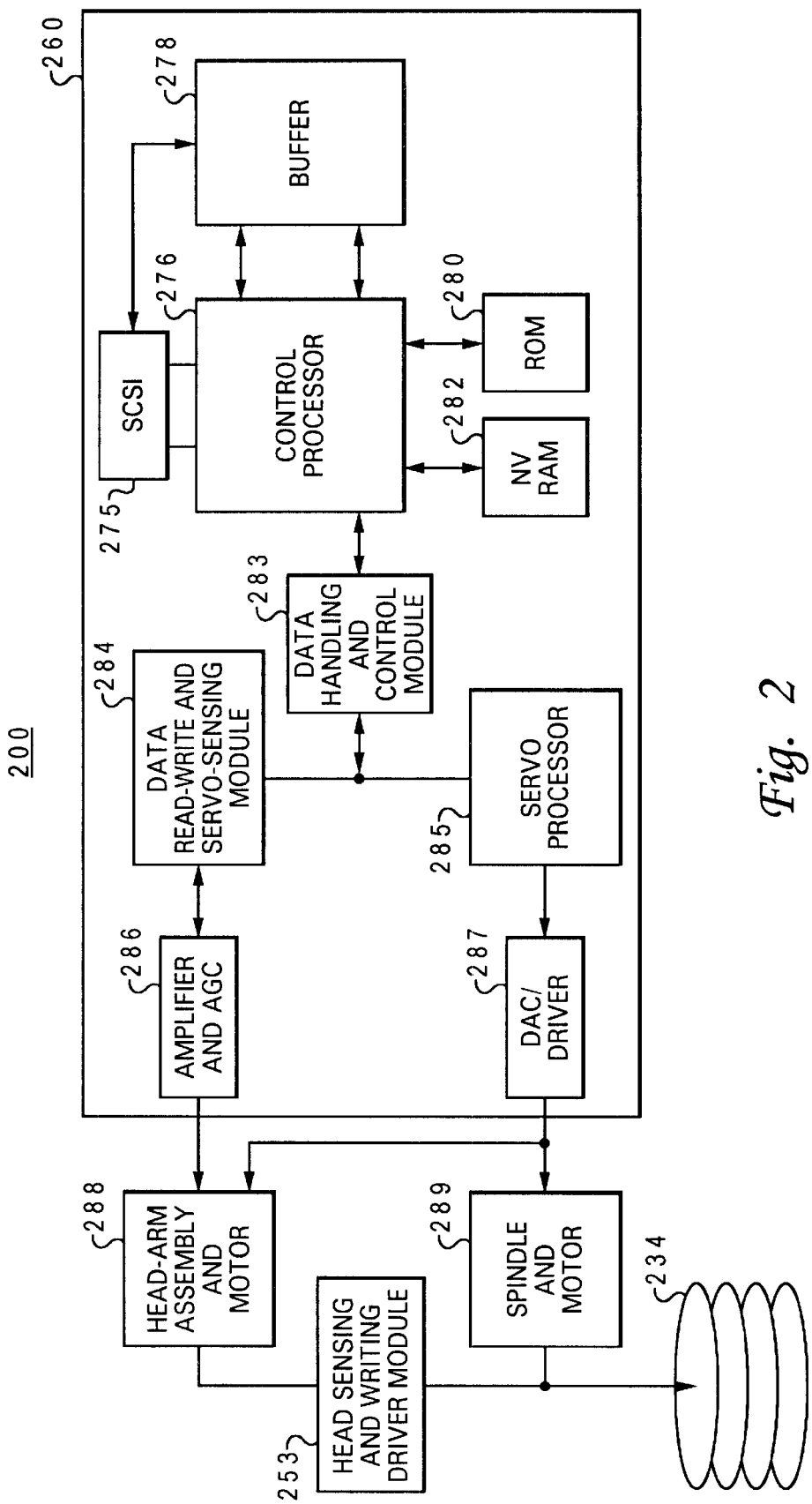
FIG. 2 depicts a block diagram of control circuitry within the hard disk drive of FIG. 1, with which the present invention may be implemented.

Referring now to FIG. 2, there is illustrated a block diagram of the control circuitry 260 within HDD system 100 of FIG. 1. Control circuitry 260 may be located within a HDD controller, such as disk controller 129. Control circuitry 260 communicates with a host processing unit, through an interface 275 such as a small computer system interface (SCSI). Control circuitry 260 controls the storage of data to, and the recovery of data from, disks 234. Control circuitry 260 comprises control processor 276, buffer 278, data-handling and control module 283, data read-write and servo-sensing module 284, servo processor 285, amplifier and automatic gain control (AGC) 286, and digital-to-analog converter (DAC)/motor driver 287.

Control processor 276 may be initialized upon system power up, or it may have access to a small read-only memory (ROM) 280 and a small non-volatile RAM (NVRAM) 282 for program instructions. ROM 280 may hold a supervisor program executable on control processor 276 to carry out the process of the invention as further described with reference to FIG. 4. Control processor 276 may access buffer 278 for commands of execution. In addition, buffer 278 is also for temporarily holding data in transit between a data processing system, such as data processing system 100 and disks 234. After the physical location on disks 234 has been determined by servo-sensing circuit within data read-write and servo-sensing module 284, servo processor 285 then sends signals, which is then converted to analog form for motor control by DAC/motor-driver 287. Head-arm assembly & motor 288 and spindle & motor 289 then access disks 234. Typically, servo processor 285 is a high-speed digital signal processor. Data read and write operations are performed by head-sensing and writing driver module 253, processed by amplifier and AGC 286 and data read-write circuits within data read-write and servo-sensing module 284. Data conversion, ECC, and control-timing functions are provided by data handling and control module 283.

The present invention provides a servo estimation and compensation method and system that provide real time estimation of and compensation for secondary head velocity and displacement induced by the deformation of the coil and carriage. Including within the method and system are a state space model for predicting the deformation of the coil and carriage with a motor torque on it, an independent servo observer that estimates the secondary head velocity and displacement, and a controller that compensates for the secondary head velocity and displacement in track follow and seek operations.

Figure 3:
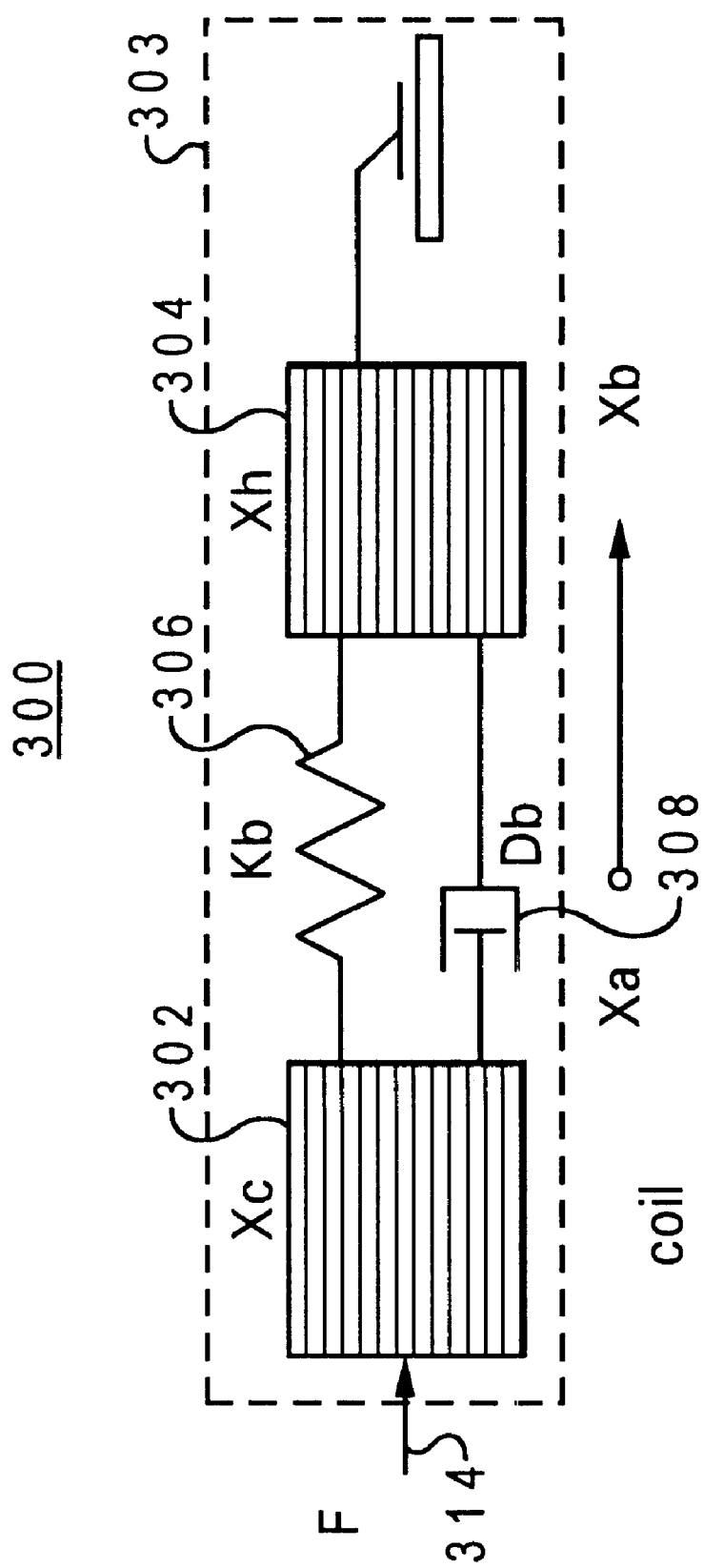
FIG. 3 is a simplified schematic diagram depicting a representative mechanical dynamics model of a Hard Disk Drive (HDD) suspension and head apparatus experiencing mechanical resonance.

Turning now to FIG. 3 there is depicted a simplified schematic state space model 300 representative of the mechanical dynamics of a HDD head positioning assembly 303 experiencing mechanical vibration. In terms of an actual head-positioning system, head positioning assembly 303 represents the servo motor arm coil and carriage assembly comprised of subpart masses 302 and 304 which characterize dynamics phenomena experienced by suspension and head apparatus 303 during track follow and seek operations. In a preferred embodiment of the present invention, a model such as state space model 300 is predetermined in accordance with the particular physical characteristics of a given head-positioning system.

In the present example, state space model 300 is a two-mass-spring-damper system comprised of suspension and head apparatus 303 acted upon by an external actuator force 314. Suspension and head apparatus 303 includes masses 302 and 304 with an interconnecting spring 306 and damper 308. Mass 302 represents a coil and carriage arm actuator assembly (such as actuator 126, for example) and mobile mass 304 represents the inertia of a suspension and head assembly such as suspension and head assembly 115. An armature supports and position a read/write head which is positioned with respect to data tracks on a data disk.

As illustrated in FIG. 3, spring 306 and damper 308 serve as the dynamic elements that simulate the inherent flexibility, or non-rigid quality, within HDD suspension and head apparatus 303. Within state space model 300, actuator force 314 simulates the force, or torque applied to the HDD suspension and head apparatus 303 by a VCM such as VCM 127 of FIG. 1. For a mathematical description of state space model 300, see Appendix A. A mathematical model describing butterfly mode resonance, such as that provided in Appendix A, is based on the two-mass-spring-damper system of FIG. 3. Such a mathematical model may be implemented within a digital servo controller such as controller 129 as a set of program instructions that perform a matrix multiplication in accordance with the state space model.

Within such a mathematical model, the motion of mass 302 represents the motion of a coil and carriage assembly and is therefore equivalent to the motion of an infinitely rigid head/suspension/actuator assembly. The motion of mass 304, relative to the motion of mass 302, represents the additional motion of the head resulting from mechanical flexibility of the coil and carriage. The displacement and velocity of the secondary motion of the head are then constructively utilized as a new servo observer for the head positioning assembly during track follow and seek operations on disk 312. By anticipating BFM resonance characteristics, such as the frequency and amplitude of vibration, secondary head velocity and displacement can be estimated in real-time utilizing a model analogous to that depicted in FIG. 3. This secondary head velocity and displacement estimation acts as a virtual sensor and is fed back to a current controller, such as controllers 123 or 229 to compensate for the corresponding undesired displacement during track follow and seek operations.

Figure 4:
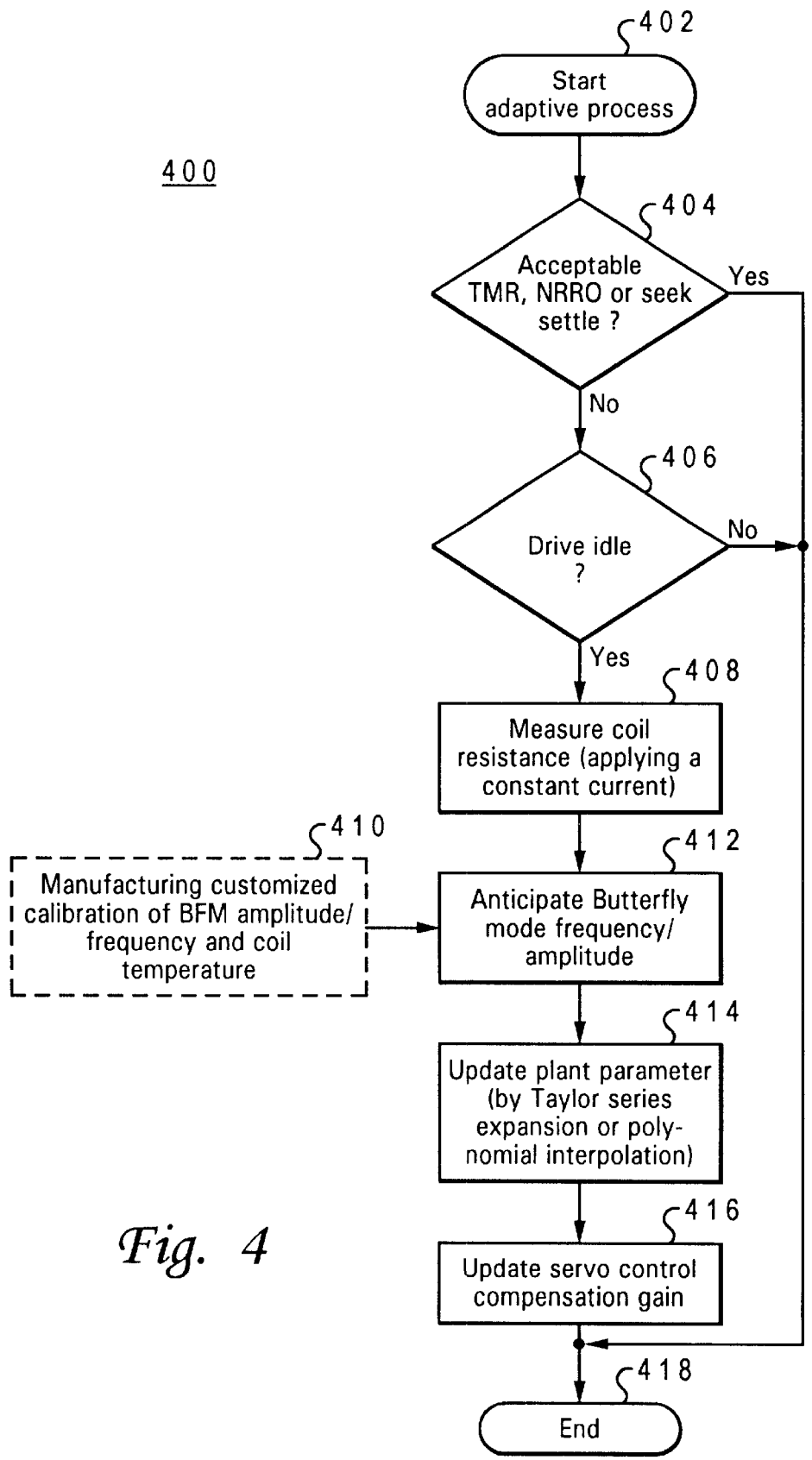
FIG. 4 is a high level logic diagram illustrating a sequence of steps that that encompass one embodiment of the present invention in which butterfly mode is tracked and compensated for in accordance with the present invention.

FIG. 4 is a high level flow chart illustrating a BFM tracking and compensation method 400 encompassing one embodiment of the present invention. Method 400 commences at start step 402 and proceeds to inquiry step 404 which depicts an evaluation of disk drive operational parameters such as TMR, non-repeatable runout (NRRO) or seek settle time. As illustrated at steps 404 and 418, as long as each of these operational parameters is within an acceptable threshold range, the adaptive parametric adjustment method of the present invention is unnecessary. If, as depicted at steps 404 and 406, at least one of the operational parameters falls outside a predetermined threshold limit, the adaptive process of method 400 will be initiated when the drive is idle (no current read/write operations underway) The determination that the drive is idle may be made by control processor 276 within a servo controller 129 and delivered to parameter sensor 133.

When it has been determined that the disk drive is idle, a sensor such as parameter sensor 133 measures the resistance of the coil within the actuator means as depicted at step 408. In the embodiment shown in FIG. 4, the resistance of the coil is obtained by the sensor by applying a known current through the coil and measuring the resulting voltage drop across the coil. A coil temperature versus resistance profile (not depicted) renders an estimation of the corresponding coil temperature from which BFM resonant mode characteristics such as BFM amplitude and frequency depend. Having obtained the coil temperature as the relevant BFM indicator, method 400 continues at step 412 which depicts anticipation of the BFM frequency and/or amplitude in accordance with both the estimated temperature and calibration data 410.

For the embodiment depicted, manufacturing calibration data 410 is utilized along with the resistance value obtained at step 408 to estimate the resonant frequency. Next, at steps 414 and 416, the frequency estimate obtained at step 412 is utilized in adaptively adjusting plant parameters as necessary. The compensation gain control parameter may thus be updated as necessary at step 416 in accordance with the modeled result obtained at step 414.

Figure 5:
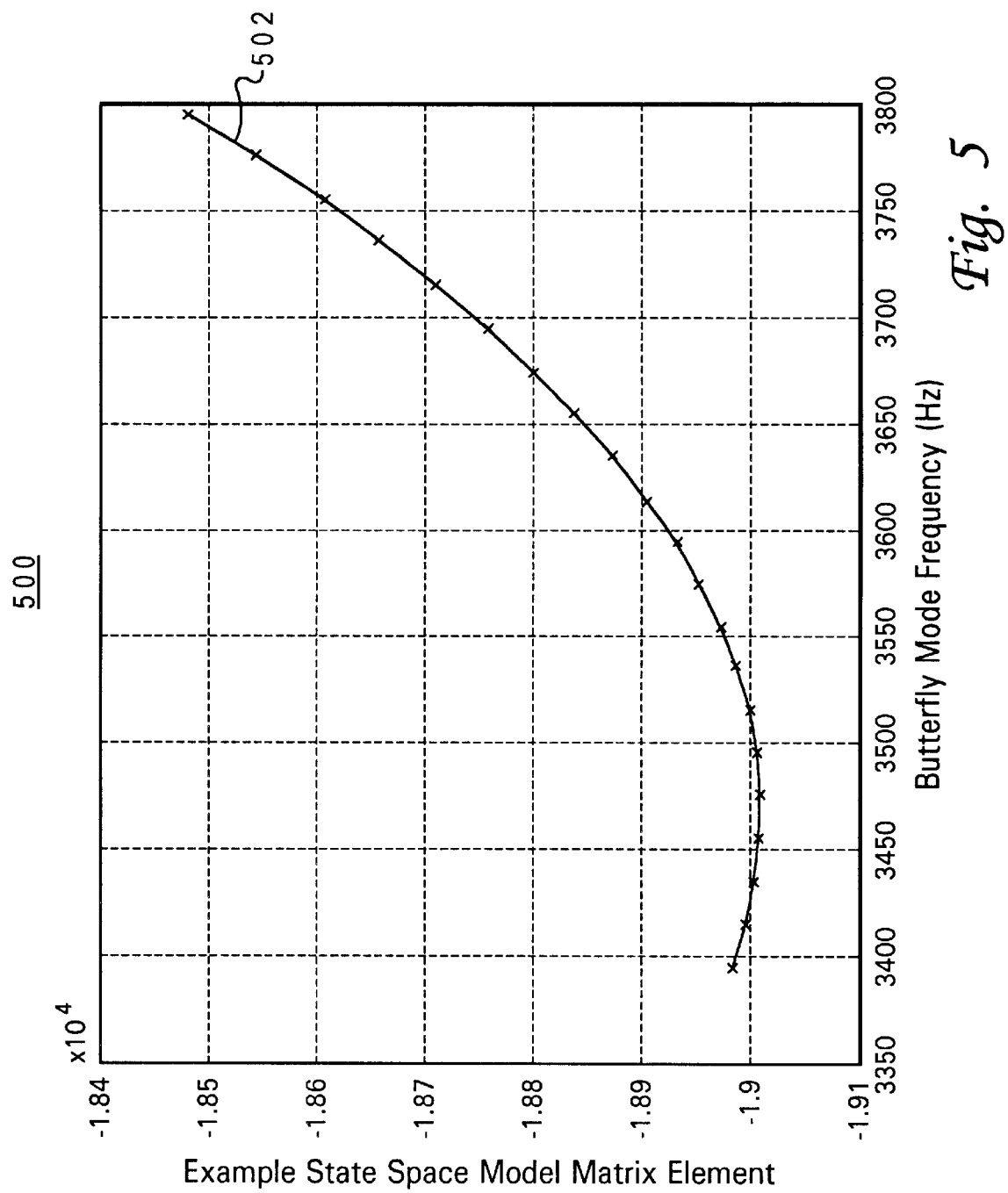
FIG. 5 is a graphical representation of parametric updates performed in response to changes in butterfly mode frequency.

FIG. 5 provides a graphical representation 500 of parametric updates performed in response to changes in BFM frequency. The x-axis illustrates a typical frequency range of BFM resonant frequencies. The y-axis depicts a range of state space model parameter values over which a single state space matrix element varies as a function of BFM frequancy. Curve 502 depicts an exemplary point within the matrix space of a state space model from which compensation gain adjustments may be derived. It should be noted that this particular choice is just one example and other points within the same matrix space could be chosen as an illustration without departing from the scope of the present invention. The points within curve 502 represents one matrix element within the discretized state space model derived from the continuous time state space model provided in Appendix A.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 3 and 4 can be accomplished with a computer-aided device. In such a method, data stored in a memory unit of a data-processing system such as a data-processing system, can represent steps in a method for implementing a preferred embodiment of the present invention.

What is claimed is:

1. A method for adaptively compensating for real-time variations in mechanical dynamics of a head-positioning assembly during track follow and seek operations, said head-positioning assembly having an actuator that positions a read/write head utilizing a coil and carriage in accordance with an actuator control signal, said method comprising the steps of:

anticipating at least one butterfly mode characteristic within said head-positioning assembly during track follow and seek operations;

determining a secondary velocity and displacement of said read/write head in response to said anticipating step; and dynamically adjusting said actuator control signal to compensate for said determined secondary head velocity and displacement in response to said determining step, thereby minimizing butterfly frequency interference within said head positioning assembly.

2. The method of claim 1, wherein said computing step further comprises modeling secondary velocity and displacement of said read/write head utilizing a state space model which provides a mathematical representation of dynamic deformation of said coil and carriage during track follow and seek operations.

3. The method of claim 2, wherein said determined secondary velocity and displacement are a function of said at least one butterfly mode characteristic, and wherein said determining step further comprises the step of translating said anticipated butterfly mode characteristic into a secondary head velocity and displacement utilizing said state space model.

4. The method of claim 2, wherein said at least one butterfly mode characteristic includes butterfly mode resonant amplitude and butterfly mode resonant frequency.

5. The method of claim 4, wherein said modeling step further comprises adaptively updating said state space model in accordance with the anticipated butterfly mode frequency and amplitude.

6. The method of claim 5, wherein said step of determining a secondary velocity and displacement of said read/write head further comprises the step of adaptively updating said mathematical representation provided by said state space model in real-time during operation of said head positioning assembly.

7. The method of claim 6, wherein said updating step further comprises performing a Taylor series expansion or a polynomial interpolation.

8. The method of claim 1, wherein said anticipating step further comprises predicting a variation in at least one of said butterfly mode characteristics in real-time during operation of said head positioning assembly.

9. The method of claim 8, wherein said step of predicting a variation in at least one of said butterfly mode characteristics further comprises estimating at least one operating parameter of said head positioning assembly, wherein said butterfly mode characteristics vary as a function of said operating parameter.

10. The method of claim 9, wherein said at least one operating parameter is coil temperature, and wherein said estimating step further comprises determining the temperature of said coil.

11. The method of claim 10, wherein said step of determining the temperature of said coil comprises measuring an electrical resistance of said coil.

12. The method of claim 10, wherein said anticipating step further comprises performing a limited band error rejection transfer function calibration to correlate said at least one butterfly mode characteristic with said at least one operating parameter.

13. The method of claim 12, further comprising the step of performing a limited band error rejection transfer function calibration to determine the temperature dependence of said at least one butterfly mode characteristic within said head positioning assembly.

14. The method of claim 12, wherein said calibrating step is initiated by the step of detecting a head positioning error trigger event.

15. The method of claim 14, wherein said trigger event is a threshold level of track misregistration or a threshold level of non-repeatable spindle runout.

16. The method of claim 9, wherein said at least one operating parameter is electrical power consumed by said coil, and wherein said anticipating step further comprises computing a real-time running average of average power consumption within said coil.

17. A system for adaptively compensating for real-time variations in mechanical dynamics of a head-positioning assembly during track follow and seek operations, said head-positioning assembly having an actuator that positions a read/write head utilizing a coil and carriage in accordance with an actuator control signal, said system comprising:

means for anticipating at least one butterfly mode characteristic within said head-positioning assembly during track follow and seek operations;

means for determining a secondary velocity and displacement of said read/write head responsive to said anticipating means; and means for dynamically adjusting said actuator control signal to compensate for said determined secondary head velocity and displacement responsive to said determining means, thereby minimizing butterfly frequency interference within said head positioning assembly.

18. The system of claim 17, wherein said determining means further comprises a state space model which provides a mathematical representation of dynamic deformation of said coil and carriage during track follow and seek operations.

19. The system of claim 18, wherein said determined secondary velocity and displacement are a function of said at least one butterfly mode characteristic, and wherein said determining means further comprises means for translating said anticipated butterfly mode characteristic into a secondary head velocity and displacement utilizing said state space model.

20. The system of claim 18, wherein said at least one butterfly mode characteristic includes butterfly mode resonant amplitude and butterfly mode resonant frequency.

21. The system of claim 20, further comprising means for adaptively updating said state space model in accordance with the anticipated butterfly mode frequency and amplitude.

22. The system of claim 21, wherein said means for determining a secondary velocity and displacement of said read/write head further comprises means for adaptively updating said mathematical representation provided by said state space model in real-time during operation of said head positioning assembly.

23. The system of claim 22, wherein said updating means further comprises means for performing a Taylor series expansion or a polynomial interpolation.

24. The system of claim 17, wherein said anticipating means further comprises means for predicting a variation in at least one of said butterfly mode characteristics in real-time during operation of said head positioning assembly.

25. The system of claim 24, wherein said means for predicting a variation in at least one of said butterfly mode characteristics further comprises means for estimating at least one operating parameter of said head positioning assembly, wherein said butterfly mode characteristics vary as a function of said operating parameter.

26. The system of claim 25, wherein said at least one operating parameter is coil temperature, and wherein said estimating means further comprises means for determining the temperature of said coil.

27. The system of claim 26, wherein said means for determining the temperature of said coil comprises means for measuring an electrical resistance of said coil.

28. The system of claim 26, wherein said anticipating means further comprises means for performing a limited band error rejection transfer function calibration to correlate said at least one butterfly mode characteristic with said at least one operating parameter.

29. The system of claim 28, further comprising means for performing a limited band error rejection transfer function calibration to determine the temperature dependence of said at least one butterfly mode characteristic within said head positioning assembly.

30. The system of claim 28, wherein said calibrating means is initiated by a head positioning error trigger event.

31. The system of claim 30, wherein said trigger event is a threshold level of track misregistration or a threshold level of non-repeatable spindle runout.

32. The system of claim 25, wherein said at least one operating parameter is electrical power consumed by said coil, and wherein said anticipating means further comprises means for computing a real-time running average of average power consumption within said coil.

33. A program product stored in signal bearing media for adaptively compensating for real-time variations in mechanical dynamics of a head-positioning assembly during track follow and seek operations, said head-positioning assembly having an actuator that positions a read/write head utilizing a coil and carriage in accordance with an actuator control signal, said program product comprising:

instruction means for anticipating at least one butterfly mode characteristic within said head-positioning assembly during track follow and seek operations;

instruction means for determining a secondary velocity and displacement of said read/write head responsive to said anticipating instruction means; and instruction means for dynamically adjusting said actuator control signal to compensate for said determined secondary head velocity and displacement responsive to said determining instruction means, thereby minimizing butterfly frequency interference within said head positioning assembly.

34. The program product of claim 33, wherein said determining instruction means further comprises instruction means for modeling secondary velocity and displacement of said read/write head utilizing a state space model which provides a mathematical representation of the extent of dynamic deformation of said coil and carriage during track follow and seek operations.

35. The program product of claim 34, wherein said determined secondary velocity and displacement are a function of said at least one butterfly mode characteristic, said program product further comprising instruction means for translating said at least one butterfly mode characteristic into a secondary head velocity and displacement utilizing said state space model.

36. The program product of claim 34, wherein said at least one butterfly mode characteristic includes butterfly mode resonant amplitude and butterfly mode resonant frequency.

37. The program product of claim 36, further comprising instruction means for adaptively updating said state space model in accordance with the anticipated butterfly mode frequency and amplitude.

38. The program product of claim 37, further comprising instruction means for adaptively updating said mathematical representation provided by said state space model in real-time during operation of said head positioning assembly.

39. The program product of claim 38, further comprising instruction means for performing a Taylor series expansion or a polynomial interpolation.

40. The program product of claim 33, further comprising instruction means for predicting a variation in at least one of said butterfly mode characteristics in real-time during operation of said head positioning assembly.

41. The program product of claim 40, further comprising instruction means for estimating at least one operating parameter of said head positioning assembly, wherein said butterfly mode characteristics vary as a function of said operating parameter.

42. The program product of claim 41, wherein said at least one operating parameter is coil temperature, said program product further comprising instruction means for determining the temperature of said coil.

43. The program product of claim 42, wherein said instruction means for determining the temperature of said coil comprises instruction means for measuring an electrical resistance of said coil.

44. The program product of claim 42, further comprising instruction means for performing a limited band error rejection transfer function calibration to correlate said at least one butterfly mode characteristic with said at least one operating parameter.

45. The program product of claim 44, further comprising instruction means for performing a limited band error rejection transfer function calibration to determine the temperature dependence of said at least one butterfly mode characteristic within said head positioning assembly.

46. The program product of claim 44, wherein said calibrating instruction means is initiated by a head positioning error trigger event.

47. The program product of claim 46, wherein said trigger event is a threshold level of track misregistration or a threshold level of non-repeatable spindle runout.

48. The program product of claim 41, wherein said at least one operating parameter is electrical power consumed by said coil, and wherein said program product further comprises instruction means for computing a real-time running average of average power consumption within said coil.

\* \* \* \* \*